(12) United States Patent
Minowa (10) Patent No.: US 6,967,733 B1
(45) Date of Patent: Nov. 22, 2005

(54) PRINTER AND A CONTROL METHOD AND RECORDING MEDIUM FOR THE SAME

(75) Inventor: Masahiro Minowa, Hata-machi (JP)

(73) Assignee: Seiko Epson Corporation, Tokyo (JP)

( * ) Notice: Subject to any disclaimer, the term of this patent is extended or adjusted under 35 U.S.C. 154(b) by 994 days.

(21) Appl. No.: 09/653,422

(22) Filed: Aug. 31, 2000

(30) Foreign Application Priority Data

Sep. 2, 1999 (JP) .................................. 11-249248

(51) Int. Cl.[7] .......................... G06F 15/00; G03G 15/00
(52) U.S. Cl. ........................ 358/1.15; 399/13; 399/24; 399/25; 399/26; 399/27; 399/28; 399/29; 399/30
(58) Field of Search .................. 399/8, 13, 24–30; 358/304, 1.1, 1.15, 406, 504

(56) References Cited

U.S. PATENT DOCUMENTS

| | | | |
|---|---|---|---|
| 4,586,147 A | | 4/1986 | Tadokoro |
| 5,479,467 A | | 12/1995 | Katsumata |
| 5,550,956 A | * | 8/1996 | Tadokoro .................. 358/1.14 |
| 5,666,585 A | * | 9/1997 | Nagira et al. ................. 399/10 |
| 5,873,009 A | * | 2/1999 | Yamashita et al. ............ 399/8 |
| 5,930,553 A | * | 7/1999 | Hirst et al. .................... 399/8 |
| 5,950,038 A | * | 9/1999 | Okui .......................... 399/43 |
| 6,236,818 B1 | * | 5/2001 | Endo et al. ................... 399/55 |
| 6,762,854 B1 | * | 7/2004 | Murakami et al. ......... 358/1.16 |

FOREIGN PATENT DOCUMENTS

| | | |
|---|---|---|
| EP | 0 085 975 | 8/1983 |
| EP | 0 873 873 A2 | 10/1998 |
| EP | 0 919 392 | 6/1999 |
| EP | 0 919 392 A1 | 6/1999 |
| EP | 919392 A1 * | 6/1999 .......... B41J 29/393 |
| JP | 58-136473 | 8/1983 |
| JP | 5-77503 | 3/1993 |
| JP | 5-278302 | 10/1993 |
| JP | 6-15921 | 1/1994 |
| JP | 7-246758 | 9/1995 |
| JP | 8-221480 | 8/1996 |
| JP | 8-323690 | 12/1996 |
| JP | 9-39318 | 2/1997 |
| JP | 9-141869 | 6/1997 |

(Continued)

*Primary Examiner*—Edward Coles
*Assistant Examiner*—Chan S. Park
(74) *Attorney, Agent, or Firm*—Mark P. Watson (57) ABSTRACT

A printer, printer control method, and medium for storing the control method meter and store cumulative values relating to the operation of replaceable units (parts or devices) in the printer to make maintenance easier and more reliable, and enable more accurate analysis of part or device failure. The printing processor of the printer prints text or graphics, and a holder holds a replaceable part or device that operates or a consumable that is used in conjunction with the printing operation of the printing processor. A counting processor meters operation or use of the replaceable part or device, and a detection processor detects when the part or device in the holder has been replaced or newly installed. Values indicative of the operation or use metered by the counting processor are stored in nonvolatile memory. When the detection process detects a replaceable part or device has been replaced or installed, the usage values metered for that part or device are stored in memory, and usage values for the new or replacement part or device are stored in a new area in memory.

15 Claims, 9 Drawing Sheets

FOREIGN PATENT DOCUMENTS

| | | |
|---|---|---|
| JP | 10-149065 | 6/1998 |
| JP | 10-181041 | 7/1998 |
| JP | 11-3194 | 1/1999 |
| JP | 11-161456 | 6/1999 |
| JP | 2968791 | 8/1999 |
| JP | 11-328042 | 11/1999 |

* cited by examiner

| Production Number | Number of Times | Loaded Date | Unloaded Date | Warning Date |
|---|---|---|---|---|
| BL99000110 | 3500×1000 | 99.07.04 | 99.09.13 | 99.08.30 |
| BL99010032 | 3800×1000 | 99.09.13 | 99.12.12 | 99.11.18 |
| BL99018711 | 255×1000 | 99.12.12 | 00.00.00 | |

- 501a: Production Number
- 501b: Number of Times
- 501c: Loaded Date
- 501d: Unloaded Date
- 501e: Warning Date

502

| Production Number | Number of Times | Loaded Date | Unloaded Date | Warning Date |
|---|---|---|---|---|
| CL99001000 | 2120×1000 | 99.07.04 | 99.12.27 | 99.12.20 |
| CL99033330 | 560×1000 | 99.12.27 | 00.00.00 | |

- 502a: Production Number
- 502b: Number of Times
- 502c: Loaded Date
- 502d: Unloaded Date
- 502e: Warning Date

PRINTER AND A CONTROL METHOD AND RECORDING MEDIUM FOR THE SAME

BACKGROUND OF THE INVENTION

1. Field of the Invention

The present invention relates to a printer, a control method for the printer, and a data storage medium for the printer control method. More specifically, the present invention relates to a printer that stores in nonvolatile memory amounts relating to the operation of replaceable printer parts and devices or consumption of consumable printer parts and devices, including, for example, the amount of ink used for printing, the number of times a cutter for cutting paper or other print medium is operated, and the number of times a print head is driven in printing operations. The present invention further relates to a control method for the printer, and to a data storage medium for storing a program for achieving this control method.

2. Description of the Related Art

Printers are widely used for printing text and graphics on paper or other print media. Such printers are typically connected to an external data processing device such as a personal computer or other host computer that sends text or graphic data for printing, and control data for controlling the printer. The printer can also send data indicative of the printer status or operating condition to the host computer.

These printers typically use ink to print the text and graphics. An ink jet printer, for example, uses a replaceable ink cartridge, while dot impact printers and thermal transfer printers use a replaceable ink ribbon. Printers that use roll paper are also generally used as point-of-sale (POS) printers. Ink cartridges, ink ribbons, and roller paper are all printer consumables. With respect to these consumables, statistics relating to the amount of ink supplied by the ink supply unit are important for reducing printer cost, as an index for printer maintenance, operation, and management, and for new product development.

The ink jet head, dot impact head, paper cutter, and other operating parts and devices are also disposed in some printers so that they can be easily replaced by the user.

Printers used in a cash register or facsimile machine, for example, must be able to cut the printed paper in units of an appropriate length, e.g., in transaction unit or page unit lengths. Some printers are therefore designed so that the user can replace the cutter blade or cutter device. It is also desirable in such printers to gather statistics relating to, for example, the durability of the cutter blade or device.

The print head is another such replaceable part or device. The print head, particularly an ink jet head, is also commonly treated as a consumable, and information about how many times it is used is also important.

Quantitative information regarding the functionality of replaceable parts such as the ink supply unit, cutter blade, and ink jet head, and more specifically information such as ink consumption, number of form cutting operations, and number of ink ejections, is typically stored using the following two types of data in a printer according to the related art. That is:

cumulative operation since the start of use by the printer;
operation or use of a specific currently used part.

In addition, this information is stored in flash EEPROM (Electrically Erasable Programmable Read Only Memory), hard disk, or other nonvolatile storage device associated with the printer.

However, printers according to the related art typically store only one of the above two types of information for each operating part or functional part. This has made it difficult to obtain information sufficient to provide detailed maintenance and management.

Furthermore, information about how much a replaced part or device has been operated or used before being replaced is needed in order to gather statistics on the operating durability of those parts or devices.

Yet further, information about when these parts or devices are replaced and how long they were used is also valuable and can be used for the purposes noted above.

SUMMARY OF THE INVENTION

The present invention is a printer that solves the above noted problems and stores such quantitative information about replaceable functional parts, such as the amount of ink used for printing, number of times a cutter for cutting paper or other printing medium is used, and the number of times the print head is driven for printing operations, in a plurality of nonvolatile storage devices or areas for use in maintenance. The present invention also relates to a control method for a printer of the present invention, and to a data storage medium for recording a program achieving this control method.

A printer according to the present invention has a printing processor for printing text or graphics; a holder for holding a replaceable part or device used in conjunction with the printing processor; a detection processor for detecting whether a replaceable part has been mounted or replaced in the holder; nonvolatile memory for storing data in a plurality of areas; a counting processor for metering an amount relating to a specific function of the replaceable part or device; and a storage processor for cumulatively storing in a specific area in nonvolatile memory the amount relating to the specific function metered by the counting processor. When the detection processor detects that the replaceable part or device is replaced, the storage processor separately stores amounts relating to the metered specific functions of the replaceable part or device, and stores in a specific area the cumulative amount relating to the specific function.

The replaceable part or device is preferably a cutter device for cutting a print medium on which the printing processor prints text or graphics. In this case the amount relating to the specific function of the cutter device is obtained by metering, i.e. counting, the number of times the cutter device cuts the print medium.

Further preferably, the replaceable part or device is an ink cartridge for supplying ink for the printing processor to print text or graphics. In this case the amount relating to the specific function of the ink cartridge is an amount of ink actually supplied.

Yet further preferably, the replaceable part or device is a print head for printing text or graphics, and the printing processor prints text or graphics by driving the replaceable print head installed in the holder. In this case the amount relating to the specific function is calculated from a print head drive count when printing the text or graphics.

Yet further preferably, the printer also has a reporting processor. The reporting processor reports to the printing processor information relating to amounts associated with one or a plurality of specific functions stored in nonvolatile memory in response to a specific operation of the printer, and the printing processor then prints the reported information.

Yet further preferably, the printer also has a data communication processor connected to an external device for sending and receiving data with the external device. When a specific command is received from the external device, the reporting processor reports to the printing processor information relating to amounts associated with one or a plurality of specific functions stored in nonvolatile memory, and the printing processor then prints the reported information.

Yet further preferably, the external device is a host computer. When a specific command is received from the host computer, the reporting processor reports to the data communication processor information relating to amounts associated with one or a plurality of specific functions stored in nonvolatile memory, and the data communication processor then sends the information to the host computer.

Yet further preferably, the replaceable part or device of this printer is any replaceable part or device, or any consumable, used in conjunction with the printing operation of the printer.

A printer of the present invention alternatively has a printing processor for printing text or graphics; a holder for holding a replaceable part or device used in conjunction with the printing processor; a detection processor for detecting whether a replaceable part has been removed, newly installed, or replaced in the holder; nonvolatile memory for storing data in a plurality of areas; a counting processor for metering an amount relating to a specific function of the replaceable part or device; a storage processor for cumulatively storing in a specific area in nonvolatile memory the amount relating to the specific function metered by the counting processor; and a time information obtaining means for obtaining at least date information as time information. When the detection processor detects that the replaceable part or device is replaced, the storage processor sequentially stores in nonvolatile memory amounts relating to the specific metered functions of the replaceable part or device in conjunction with time information obtained from the time information obtaining means and containing at least the date of the removal, installation or replacement.

Yet further preferably, the printer also has a usage limit memory for storing a limit value indicative of a maximum usable volume or count associated with the specific function of the replaceable part or device; and a signal output section for outputting a signal indicative that the usage amount or count associated with the specific function of the replaceable part or device is approaching or has reached the stored usage limit value. When the signal output section outputs this signal, time information including at least the date obtained from the time information obtaining means is stored in memory with a correlation to the replaceable part or device.

The present invention also provides a control method for a printer having a printing processor for printing text or graphics, a holder for holding a replaceable part or device used in conjunction with the printing processor, and nonvolatile memory for statically storing data in a plurality of areas. The control method has a detection step of detecting whether a replaceable part has been newly mounted or replaced in the holder; a counting step of metering an amount relating to a specific function of the replaceable part or device starting when the detection steps detects that a replaceable part or device has been newly mounted or replaced; a storage step of storing the metered amount counted before the detection step in a specific area of memory for each replaced part or device; and a reporting step of reporting to a specified processor in response to a notification command information indicative of the amount counted in the counting step.

Yet further preferably, the replaceable part or device is a cutter device for cutting a print medium on which the printing processor prints text or graphics, and the amount relating to the specific function of the cutter device is obtained by metering a number of times the cutter device cuts the print medium.

Yet further preferably, the replaceable part or device is an ink cartridge for supplying ink for the printing processor to print text or graphics, and the amount relating to the specific function is calculated from the amount of ink supplied.

Yet further preferably, the replaceable part or device is a print head for printing text or graphics, the printing processor prints text or graphics by driving the replaceable print head installed in the holder, and the amount relating to the specific function is calculated from the number of drive operations needed to print the text or graphics.

Yet further preferably, the printer control method also has a receiving step of receiving from an external device a command requesting notification of an operating amount of a specific function; and a reporting step of reporting to the external device one or a plurality of specific operating amounts stored in memory.

Yet further preferably, the printer control method also has a receiving step of receiving from an external device a command requesting printing an operating amount of a specific function; a reporting step of passing to the printing processor one or a plurality of specific operating amounts stored in memory; and a printing step of printing the one or plural specific operating amounts by means of the printing processor.

Yet further preferably, the printer control method also has a step of storing in memory at least date information about when a part or device was removed, newly installed or replaced when notification is received that a replaceable part or device was removed, newly installed or replaced. This date information is stored in memory with a specific correlation to the usage amount information stored for a specific function of the replaceable part or device.

Yet further preferably, the printer control method also has a comparison step of comparing the cumulative usage amount with a usage limit value stored in a specific memory area, this limit value indicating a maximum usable volume or operating count associated with the specific function of the replaceable part or device; a step of outputting an alarm signal indicating that the usage amount or count associated with the specific function of the replaceable part or device is approaching or has reached the stored usage limit value; and a storage step of storing time information, including at least date information, to memory with a correlation to the replaceable part or device when the alarm signal is output.

A program achieving the functionality of the control method and printer of the present invention can be recorded on or in such data storage media as a Compact Disc, floppy disk, hard disk, magneto-optical disk, Digital Video Disc, magnetic tape, or semiconductor memory.

Furthermore, this program can be placed on a server that is computer accessible from the World Wide Web or other network so that an operator can download the program as desired for storage in a local printer or data processing device so that the program can be run and used by a local printer or data processing device.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DETAILED DESCRIPTION OF THE INVENTION

A preferred embodiment of the present invention is described next below. It should be noted that the following embodiments are illustrative of the present invention only, and shall not limit the scope of the accompanying claims. It will therefore be obvious to one with ordinary skill in the related art that various modifications will be possible using equivalent replacements for any or all of the parts described below, and that all such modifications shall be included within the scope of the present invention.

Figure 1:
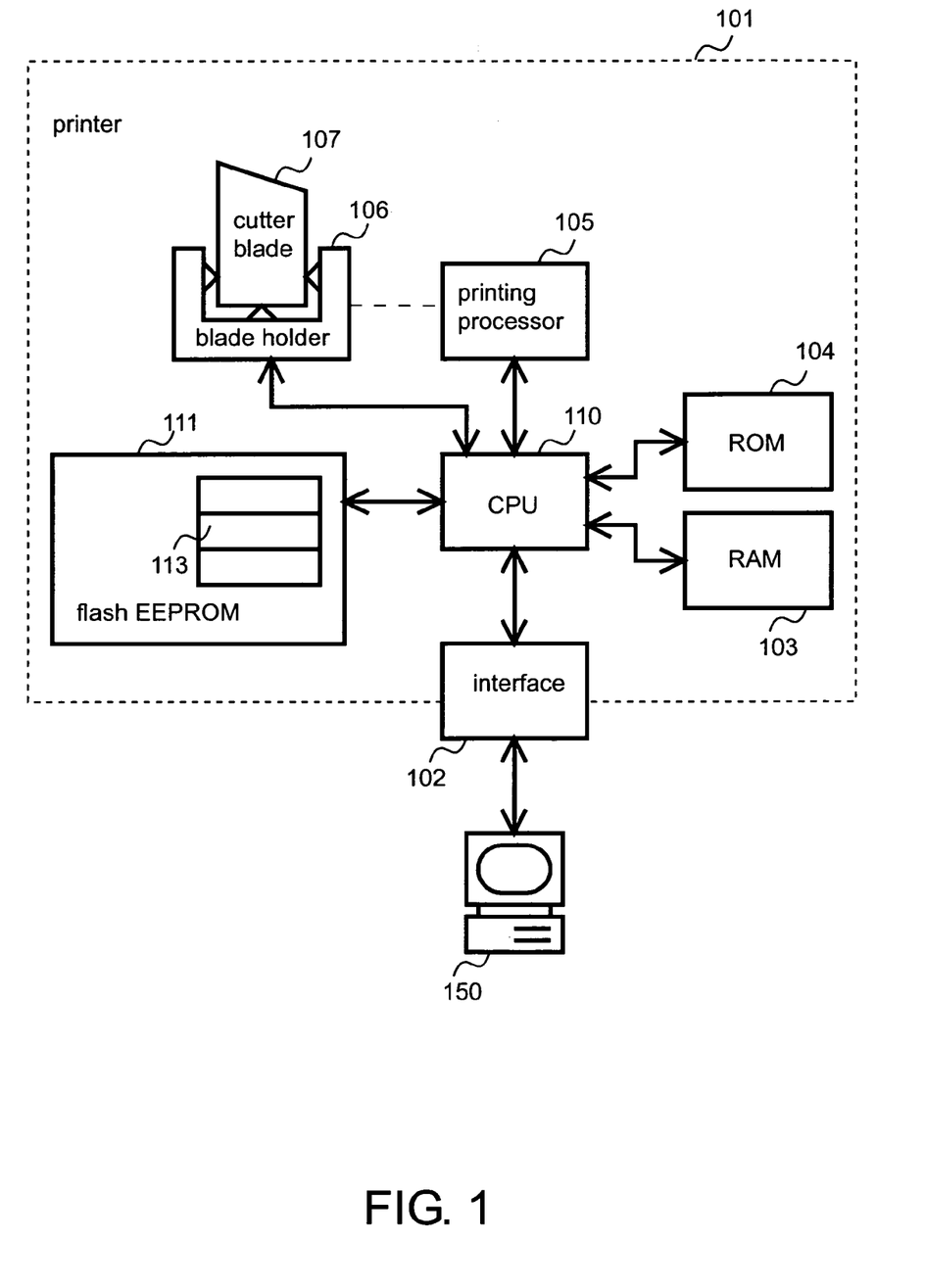
FIG. 1 is a block diagram of a printer according to a preferred embodiment of the invention.

A. Printer FIG. 1 is a block diagram of a printer according to the present invention. It should be noted that for convenience of description a cutter blade, primarily for cutting paper, is described as a replaceable part or device, and the method of the present invention can be likewise applied to other replaceable parts or devices, including an ink cartridge, ink ribbon, or other ink supply unit, an ink jet head or other type of print head, and roll paper. One with ordinary skill in the related art will readily understand applying the method of the present invention to such replaceable parts, and such parts or devices shall be included within the scope of the present invention.

Printer 101 exchanges data with host computer 150 by way of an intervening interface 102. Application programs and a printer driver, which is a type of program for controlling a printer, are also stored for access by the host computer. When a print command is received from the application program, the printer driver controls conversion of the data to a format suitable for the printer and sends the converted data to the printer. The driver also receives and interprets various signals and data from the printer, and provides necessary information to the user by way of the host computer.

When data is sent by host computer 150, interface 102 receives the data and stores it in a receive buffer forming part of RAM 103. RAM 103 can be divided into a number of sections (i.e. through addressing) and allocated as different buffers such as a receive buffer, print buffer, etc.

CPU 110 interprets data stored in the receive buffer. If the data is a print command, a print image is developed and stored in the print buffer of RAM 103. When the print buffer becomes full or at some other particular timing, CPU 110 drives the print head, platen, paper feed mechanism, and/or a printing processor 105 containing a print head driver IC, motor drive circuit, and various sensor circuits, to print the text and graphics.

After printing is completed, the paper is appropriately cut by cutter blade 107 held in blade holder 106. Cutter blade 107 is linked to a motor, plunger, or other appropriate drive source (not shown in the figures), the operation of which is controlled by CPU 110 to cut the paper in units of an appropriate length. Typically this is a transaction unit producing one receipt, or an appropriately defined page length.

Each time the paper is cut, the number of cutting operations is additively stored in a specific usage counter area 113 in flash EEPROM 111, which is a type of nonvolatile storage. It is also possible to store usage information for each of plural cutter blades 107, and to accumulate historical usage data for each of the blades, because a new usage counter area 113 is selected in flash EEPROM 111 each time the cutter blade 107 is replaced. Considering the life of flash EEPROM devices, a temporary storage area is preferably reserved in RAM 103, and data is written to the flash EEPROM 111 at a particular frequency of cutting operations or cumulatively at the end of each day, for example, in order to reduce the number of times the EEPROM is accessed. Storage area 113 thus functions as a usage counter area, and the RAM is used as temporary counter memory.

It should be noted that while the cutter blade is treated as a replaceable part in this exemplary embodiment of the present invention, a cutter assembly having both a moving blade and a fixed blade can be used as a replaceable assembly. It is further possible for this replaceable cutter assembly (device) to have a motor or other drive source that is also replaced at the same time.

As noted above, plural usage counter areas 113 assigned in flash EEPROM 111 each store the number of times a particular cutter blade 107 is used. These usage counts can then be sent via interface 102 to host computer 150 and used as maintenance information for printer 101.

The CPU 110 controls operation of the various printer parts, the control program run by CPU 110 is stored in ROM 104. When the power is turned on, CPU 110 reads and runs the program from ROM 104. This control program can also be updated as needed in ROM 104 if it is selected to be re-programmable.

It should be noted here that CPU 110 and interface 102 operate in conjunction with RAM 103 as a data sending and receiving processor, and CPU 110 operates in conjunction with other components as a detection processor, storage area reservation processor, and counting processor.

Printing processor 105 functions as a print head driver or motor driver; blade holder 106 functions as a blade holder and part detector; and cutter blade 107 functions as a replaceable operating part.

Furthermore, flash EEPROM 111 functions as the memory unit, and has an internal usage counter area 113 and counter value storage area.

Replacement of cutter blade 107 can be easily detected because cutter blade 107 is typically metal. It is therefore possible to provide two terminals on blade holder 106 such that the terminals are shorted when cutter blade 107 is installed, thus making it simple to detect when the cutter blade 107 has been replaced.

When the cutter assembly containing the cutter blade is replaced as a single unit, a switch is positioned in the holder such that the switch operates when the assembly is installed. It is thus likewise possible to easily detect when the cutter assembly is replaced.

The printer 101 can be alternatively designed so that the specific functional part is replaced after a command instructing replacement of the functional part is sent from host computer 150 to printer 101, or after a control on the front panel (not shown in the figures) of the printer 101 is operated. In this case replacement of the part can be detected by monitoring transmission of the replacement command or operation of the front panel control.

It is yet further possible to detect assembly replacement by providing the cutter assembly with a ROM or other memory device in which a serial number or other code is stored. Replacement of the cutter assembly can then be detected by reading this serial number or code.

It will also be obvious that a hard disk or other type of nonvolatile storage device can be used in place of flash EEPROM 111 as the memory unit. The host computer 150 connected by way of intervening interface 102 can alternatively be used as the memory unit. These and other variations are also included within the scope of the present invention.

B. Printer Control Process

Figure 2:
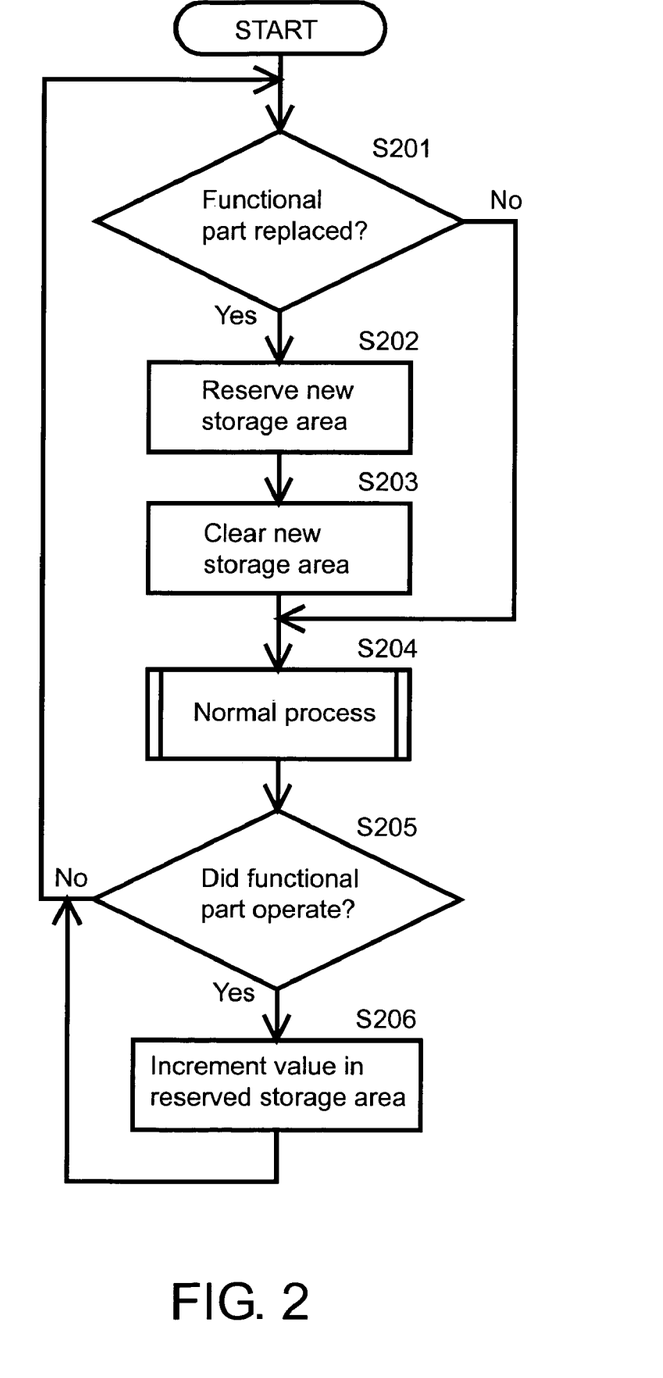
FIG. 2 is a flow chart showing the control process for controlling the printer shown in FIG. 1.

FIG. 2 is a flow chart showing a control process for controlling the printer shown in FIG. 1.

CPU 110 first detects whether cutter blade 107 (operating part) has been replaced (S201).

If cutter blade 107 was replaced (S201 returns YES), CPU 110 reserves a new usage counter area 113 in flash EEPROM 111, retains the usage counter area 113 used for the last cutter blade 107 as a historical usage counter storage area (S202), and initializes the new usage counter area 113 to zero (0) (S203). Control then advances to step S204.

If cutter blade 107 was not replaced (S201 returns NO), control skips to step S204 and the normal printer control process continues. In this normal printer control process CPU 110 interprets data sent from host computer 150 and stored in the receive buffer. If the data is a print command, it develops a print image and stores it in the print buffer of RAM 103, and drives printing processor 105 at an appropriate timing to print the text or graphics. CPU 110 also drives cutter blade 107 as necessary to cut the paper on which the text or graphics have been printed. These processes are well known in the art, and further description thereof is thus omitted below.

In this exemplary embodiment of the invention, RAM 103 is used as a temporary counter memory. The value stored in a particular address in RAM 103 is incremented each time the cutter blade 107 operates, and a specific area in flash EEPROM 111 is used as a count storage area (including usage counter areas and total usage counter area) that is updated every 100 times the cutter blade 107 operates.

CPU 110 detects (S205) whether cutter blade 107 was operated in the normal process (S204). This can be easily detected by determining if the cutter drive motor operated, for example.

If cutter blade 107 was not operated (S205 returns NO), the procedure loops back to S201. If the cutter blade 107 was operated (S205 returns YES) and the temporary counter has reached 100, the value stored in usage counter area 113 is incremented by 1 to accumulate a value representing the number of cutter blade operations (S206), and the procedure loops back to S201. The temporary counter is then reset to zero.

Figure 3:
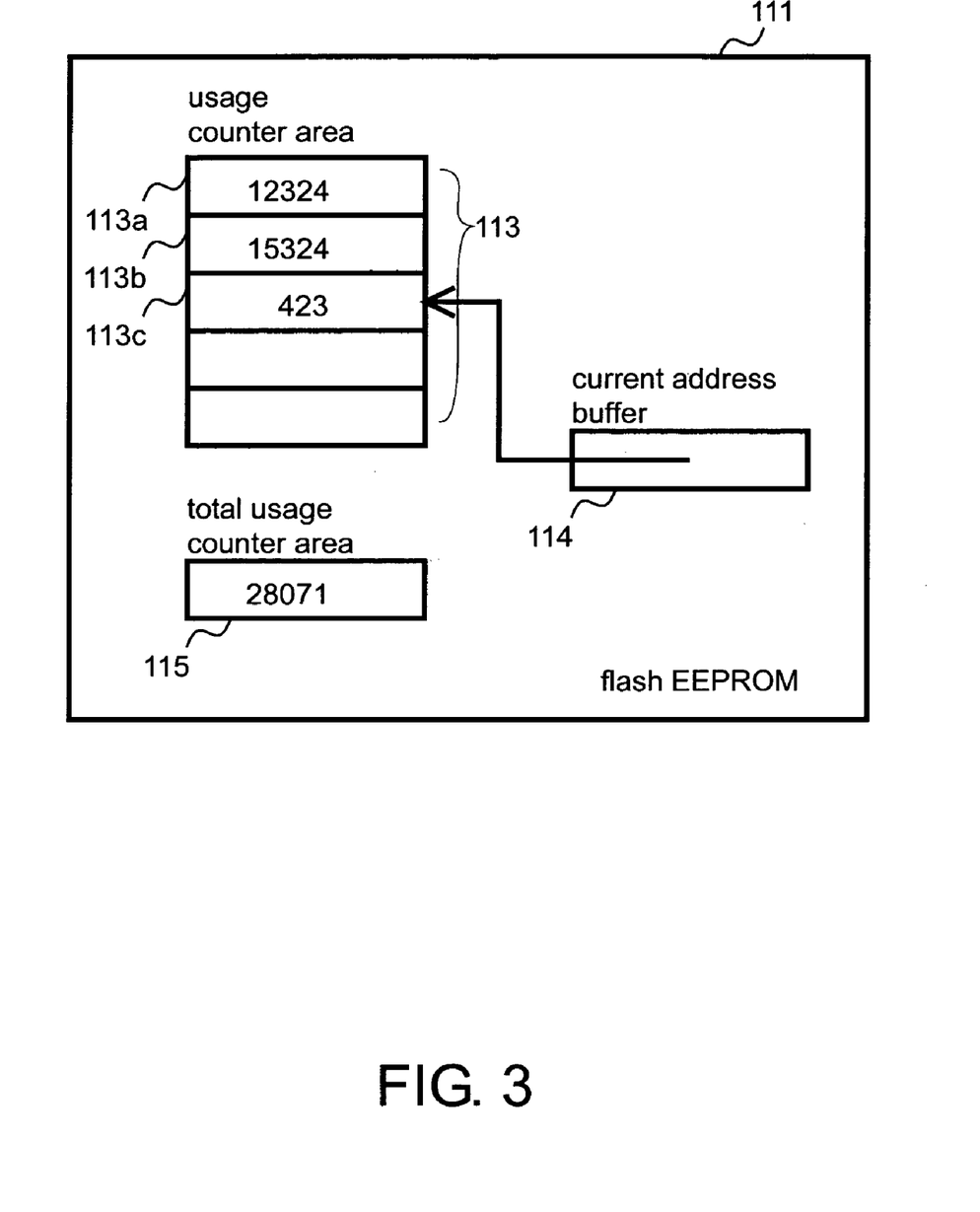
FIG. 3 shows exemplary states of the usage counter area reserved in the flash EEPROM of the printer shown in FIG. 1.

It is therefore possible, by repeating this process, to store in flash EEPROM 111 amounts (the number of times the cutter blade 107 was used, that is, the number of paper cuts, in this example) relating to specific functions of a particular operating part (cutter blade 107 in this example) each time the operating part (cutter blade 107 in this example) is replaced. FIG. 3 shows examples of values indicating usage or operation of a specific functional part stored to usage counter area 113 in the flash EEPROM 111 of the printer shown in FIG. 1.

In the example shown in FIG. 3 five usage counter areas 113a to 113e are reserved, and values are stored in three areas 113a, 113b, and 113c. From this it can be determined that the cutter blade 107 currently being used is the third blade used since the printer 101 started being used.

By reading the values stored in usage counter area 113 of flash EEPROM 111, it is further known that the first cutter blade that was used was replaced after 12,324×100 cuts; the second cutter blade was replaced after 15,324×100 cuts; and the current (third) cutter blade has so far made 423×100 cuts.

The address of the current usage counter area 113c is stored in current address buffer 114. Each time a new usage counter area 113 is reserved in step S202, the address stored in current address buffer 114 is updated (incremented) by a specific value.

A total usage counter area 115 can also be used. A value 28701 indicating the total number of cutter blade operations to present is stored in total usage counter area 115. In this exemplary embodiment the number of actual operations is 100 times the stored value. The value stored in total usage counter area 115 is updated in step S206 to provide a cumulative count.

It should be noted that while usage counter areas 113 are reserved to store values for five cutter blades in this embodiment, the present invention shall obviously not be so limited. More specifically, the number and capacity of these storage areas is preferably determined with consideration for the expected service life of the printer. It is also possible to expand the available memory as desired or necessary.

While cutter blade 107 is described as the operating part, and the number of cutter blade 107 operations is described as the operating amount to be stored, in this embodiment, in another embodiment the ink supply unit is used as an operating part for which a specific operating amount is stored. In this case, the amount of ink consumed in the normal process (S204) is accumulated in the usage counter area 113 by storing, for example, the number of black dots in the printed text or graphic. A similar value is stored when the print head, and particularly an ink jet head, is used as the operating part.

Further, more accurate ink consumption data can be obtained in printers that use an ink jet head by also accumulating the amount of ink ejected in head cleaning operations.

Furthermore, usage amounts such as the number of times a part is used, the amount consumed, or the number of operations, can be accumulated for plural parts or devices. This can be easily accomplished by likewise detecting installation or replacement of each such part or device, and providing separate usage counter areas for each such part or device in flash EEPROM 111. It would thus be possible, for example, to accumulate consumption data or operating amount data for two functional parts such as the ink supply unit and cutter blade.

C. Operating Amount Reporting Process

Figure 4:
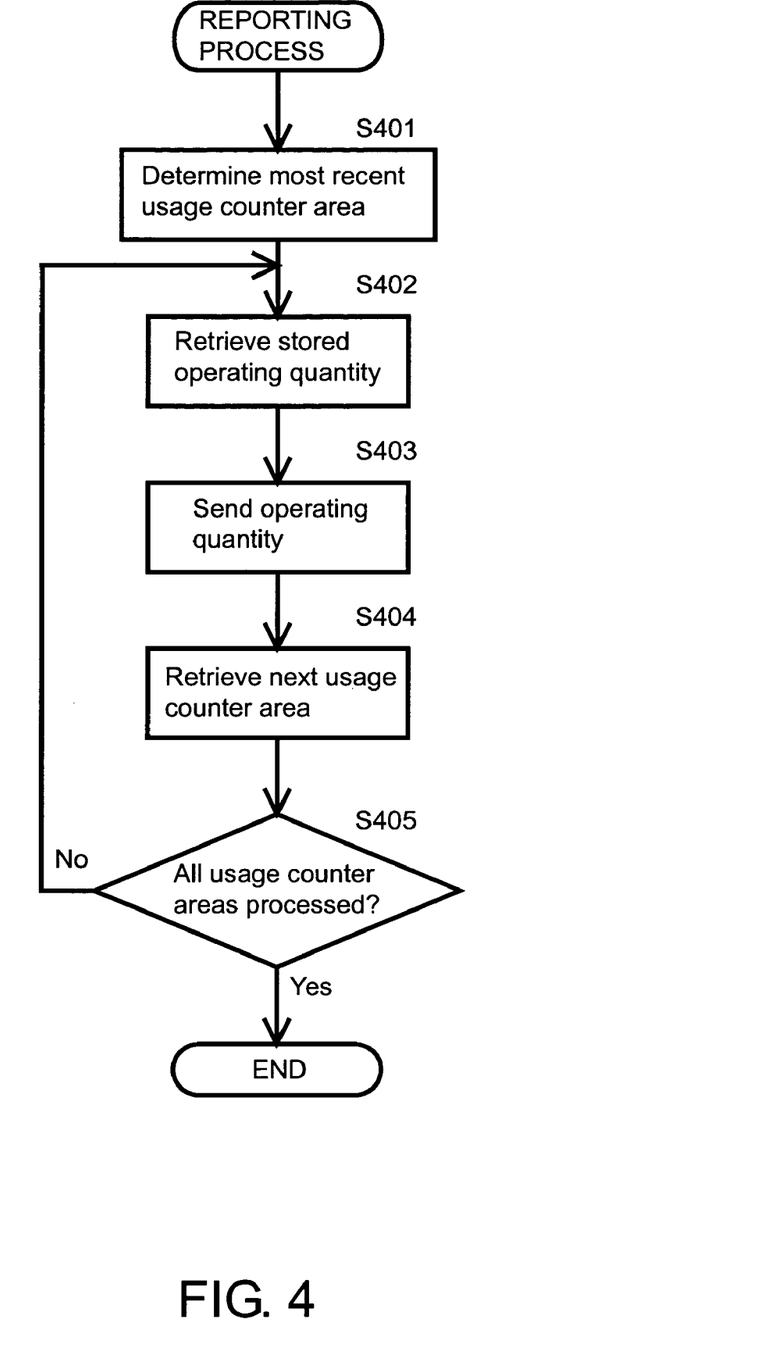
FIG. 4 is a flow chart of the reporting process run by the printer shown in FIG. 1.

As shown in FIG. 1, host computer 150 can also read the usage amount data for cutter blade 107 stored in the plural usage counter areas 113 of flash EEPROM 111 so that this information can be used in conjunction with various maintenance tasks, improving cutter blade 107 materials, and reducing cutter blade 107 cost. FIG. 4 shows a reporting process for sending such usage information from printer 101 to host computer 150. More specifically, FIG. 4 is a flow chart showing the flow of a reporting process for sending operating amount data (e.g., the number of cuts made by cutter blade 107) for a particular operating part (cutter blade 107 in this example) to the host computer 150.

This reporting process starts when the host computer 150 sends a command telling the printer to send operating amount data. An exemplary escape sequence for accomplishing this is shown below where [0x] indicates a hexadecimal value.

Ox1b 0x68 [ESC h]

The reporting process starts when the CPU 110 detects that this command has been received.

When the reporting process starts, CPU 110 reads the address of the current usage counter area 113 in flash EEPROM 111 from current address buffer 114 (also in flash EEPROM 111) (S401).

The operating amount stored in usage counter area 113 at the obtained address is then read (S402) and sent to host computer 150 (S403).

The address is then decremented a specific amount to obtain the address for the previous usage counter area 113 (S404).

The address obtained in S404 is then compared with the address of the first usage counter area 113 to detect whether the operating amount data has been sent for all usage counter areas 113 (whether all usage counter areas 113 have been processed) (S405). If all data has been sent (S405 returns YES), the reporting process ends. If not (S405 returns NO), the procedure loops back to S402.

It should also be noted that while the values stored in usage counter area 113 are sent to host computer 150 in the above example, they could also be printed on paper by driving the printing processor 105. Furthermore, the cumulative values stored in total usage counter area 115 can also be sent to the host or printed on paper using an appropriate command.

Further, in the present invention, the reporting process can be initiated by operating a control on the front panel (not shown in the figures) of printer 101.

The host computer 150 or maintenance personnel can thus obtain information required for maintenance by reviewing the operating amount (usage count) information sent to the host computer 150 or printed on paper.

Furthermore, only the number of cuts made by cutter blade 107 is stored in the present embodiment, but if the printer 101 has a real-time clock, the time or date that the cutter blade 107 is replaced can be stored to obtain even more detailed maintenance information.

Figure 5:
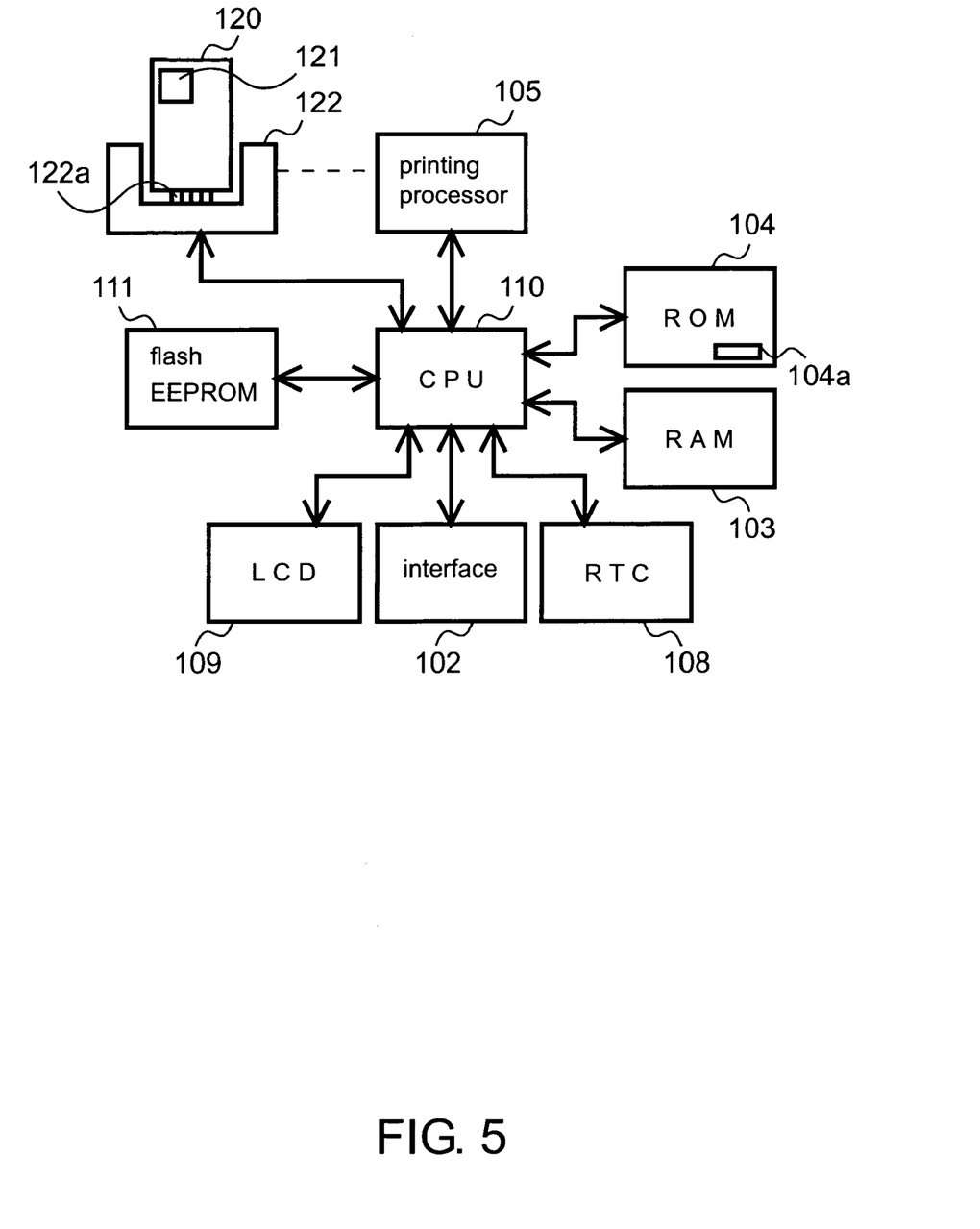
FIG. 5 is a block diagram of a printer according to an alternative embodiment of the present invention.

FIG. 5 is a block diagram of a printer according to another embodiment of the present invention. It should be noted that like parts are identified by like reference numerals in FIG. 1 and FIG. 5, and further description thereof is thus omitted below.

Printer 101 also has a real-time clock 108 for obtaining time information. This real-time clock 108 outputs date and time information needed for maintenance management, and CPU 110 retrieves this time information as needed. An LCD panel 109 is provided on the operation panel (not shown in the figures) as a device for visually presenting information to the user.

An ink jet head 120 with an ink cartridge is also used as a replaceable part. This ink jet head 120 has memory 121 for storing a production number or ink management information for the ink cartridge, and is connected to the holder 122 by an intervening connector 122a. The present embodiment is described as using only a single ink jet head, but other configurations having plural ink jet heads, such as a black ink head and a color ink head, are also common.

Whether the ink jet head 120 has been replaced when the printer 101 power is turned off can be easily detected in the configuration shown in FIG. 5 by detecting the production number stored in memory. In other words, the production number can be used as an ID number for uniquely identifying a specific ink jet head 120.

Area 104a is a specific area in ROM 104 that is used as usage limit memory for storing a value defining the maximum usage of a replaceable part or device (referred to generally as a replaceable unit). This value can thus indicate an amount such as a volume of ink, or a count such as the maximum number of cutter operations. It should be further noted that while these values are stored in ROM 104 in this embodiment, they could also be stored in flash EEPROM 111 or other nonvolatile memory device.

Figure 6:
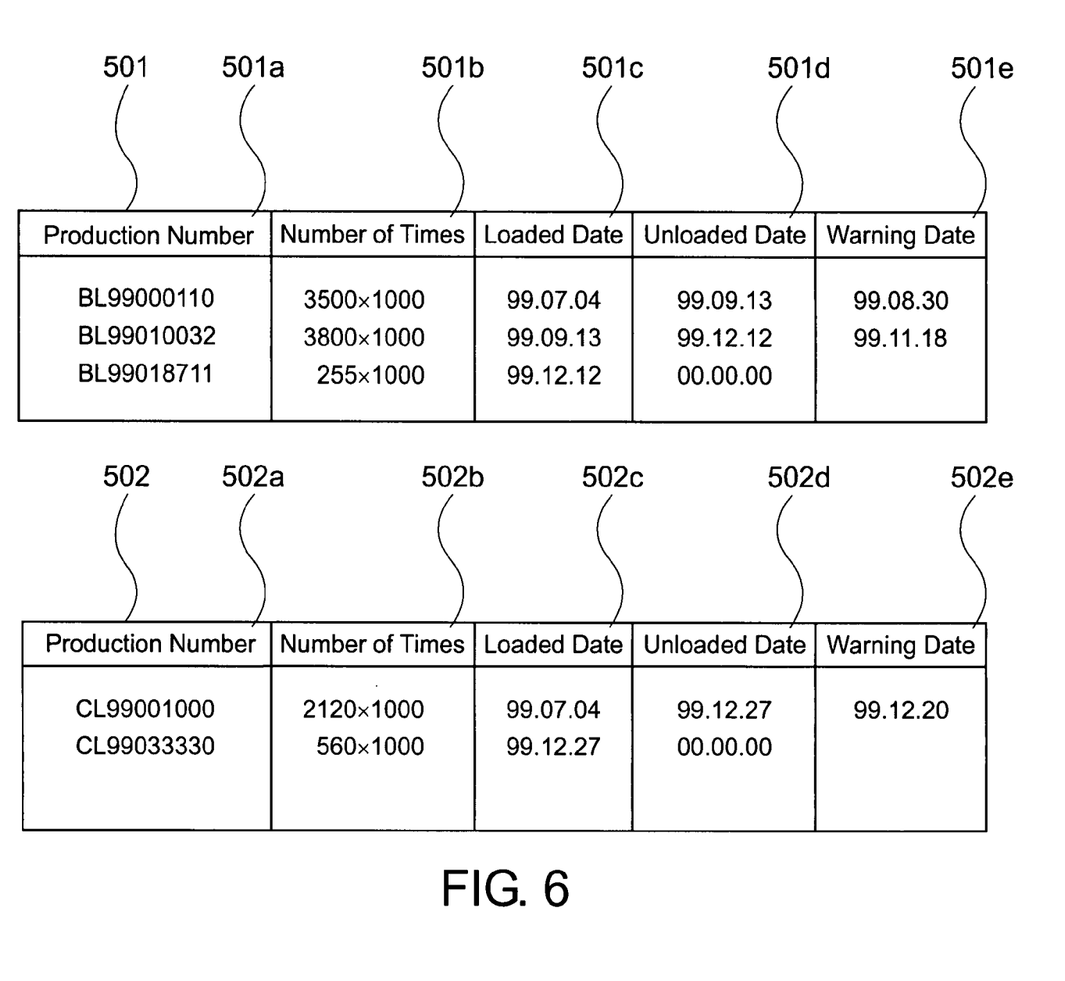
FIG. 6 shows an example of maintenance management using the timing information of a real-time clock in an alternative embodiment of the present invention.

FIG. 6 is a table of data stored in flash EEPROM 111 for maintenance management using the time data from the real-time clock, which corresponds to a time information obtaining means.

Table 501 shows the use of the black ink jet head, and table 502 shows the use of the color ink jet head. Respectively shown in the tables are ink jet head production numbers 501a, 502a; ink discharge counts 501b, 502b; installation dates 501c, 502c; and removal dates 501d, 502d.

As shown in the tables, the first black ink jet head was installed on Jul. 4, 1999, used for 3.5 million discharges, and removed on Sep. 13, 1999. The second black ink jet head was installed the same day in 1999 and removed on Dec. 12, 1999, and the third head is still in use.

The tables also show that the color head was installed on Jul. 4, 1999 and removed Dec. 27, 1999, and the second color head was installed the same day and is still in use. In other words, a date of 00.00.00 indicates installation or removal has not occurred.

This data is stored in these tables with a specific correlation to the usage counter area and other data areas reserved for storing maintenance information in flash EEPROM 111, and can thus be read from memory as needed.

Additional functions such as described below are also provided in a printer according to this preferred embodiment of the invention.

Warning Date 501e, 502e records the date on which a warning that the ink cartridge has almost run out of ink was first issued. For example, if the standard ink volume of the ink cartridge is assumed to be equivalent to 4000×1000 discharges, and a warning is to be issued when 80 percent (3200×1000) of the ink volume has been consumed, the corresponding limit value stored in area 104a of ROM 104 is 3300. When the value stored in the discharge counter area approaches or exceeds this limit value, a warning is displayed on the LCD panel 109 telling the user that the ink cartridge or ink jet head containing an integral ink cartridge should be replaced. If the LCD panel 109 can display text, textual information can be presented. If the LCD panel 109 contains only LEDs or similar devices, the user can be notified by flashing a particular LED. Alternatively, an audible alarm can be sounded.

At the same time such warning is issued, the date of the warning is stored in the specific area in memory (i.e. 501e, 502e).

This warning date can be sent to the host computer in the above-described reporting process, and the user can confirm the date that the warning was issued using a specific function provided in the printer driver used for controlling the printer from the host computer. If the user forgets to replace the ink cartridge or head with an ink cartridge, the warning date can be accessed using this printer driver function so that the warning can be reissued. Furthermore, if this information is stored in a printer accessible by plural host computers via a network, each of the computers can access and use the printer information.

It should be noted that the number of ink discharges is counted as the actual ink consumption value in the above example, but it is alternatively possible to count the actual volume of ink discharged for the print data instead of counting the discharge count. In a page printer that uses a toner cartridge, toner consumption can be monitored by counting the number of printed pages.

Figure 7:
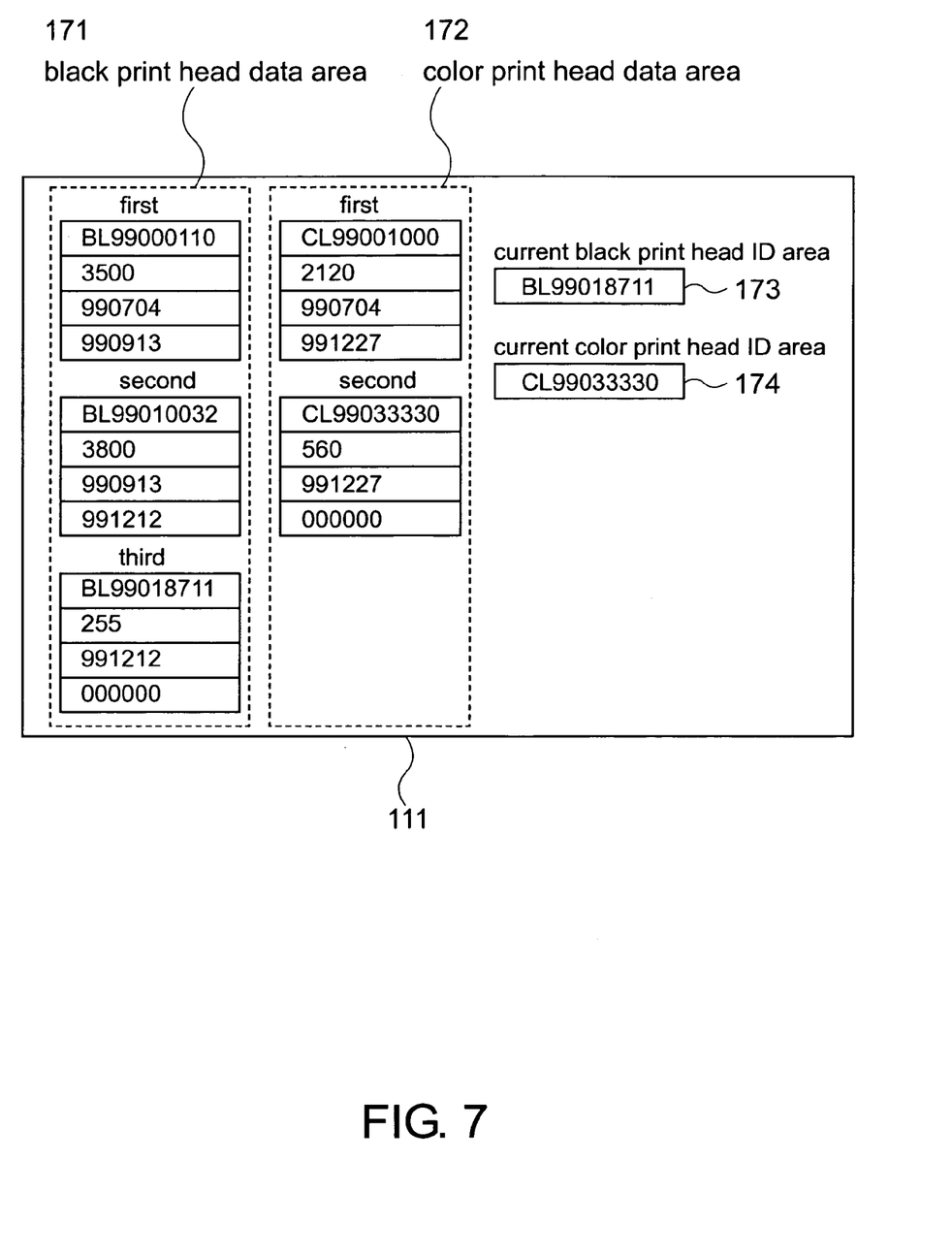
FIG. 7 is a schematic diagram of a data file stored in memory in an alternative embodiment of the present invention.

FIG. 7 is a schematic diagram showing the above data tables stored in flash EEPROM 111 in the present embodiment.

Black head data area 171 stores data for the black ink jet head; color head data area 172 stores data for the color ink jet head; black head ID area 173 stores the ID number of the current black ink jet head; and color head ID area 174 stores the ID number for the current color ink jet head. An address management area (not shown in the figure) is also provided for storing address information for each of these areas 171 to 174.

It is thus possible for data about each of the previously used ink jet heads to be stored as historical information in flash EEPROM 111.

Furthermore, if the memory provided in the ink jet head is rewritable memory, the usage history can also be written to the ink jet head memory. In this case, the memory can be recovered when the ink jet head is recycled to gather information about ink jet head use. This information can then be used in further product development.

Figure 8:
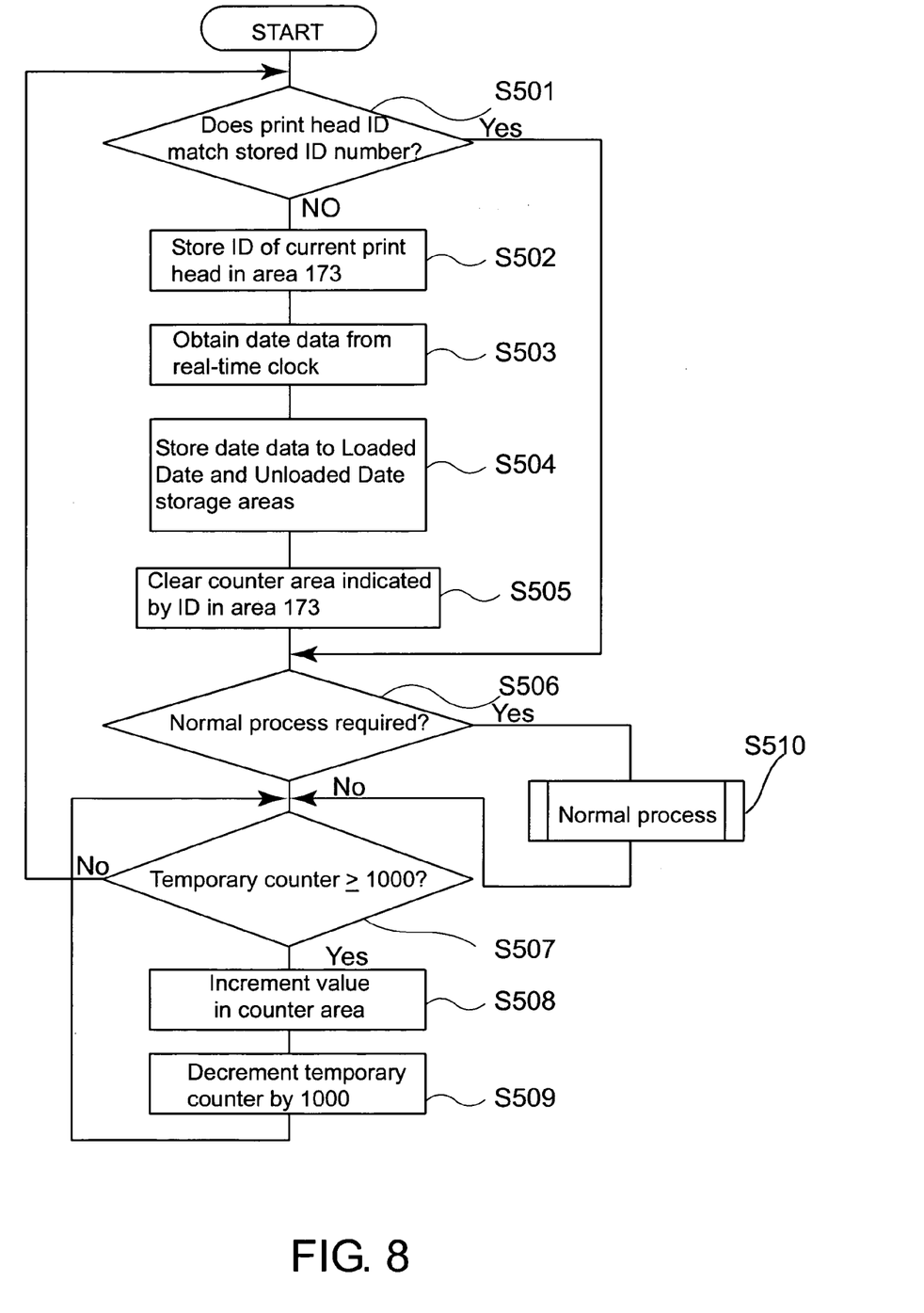
FIG. 8 is a flow chart of an alternative embodiment of a control method for a printer according to the present invention.

FIG. 8 is a flow chart showing an alternative control method for a printer using the above noted ink jet head.

Whether or not the head was replaced is detected first (S501). This step is normally run when printer power is turned on. In this case, the head ID number, which in this example is a production number, is read from memory provided in the ink jet head, and then compared with the currently stored ink jet head ID number. If these numbers are the same, control skips to step S506 and the normal printing process commences.

If the numbers are different, it is known that the head has been replaced. The new ID number is therefore stored in area 173 in flash EEPROM 111 as the updated ID number (S502), and the current time data, including at least the date, is obtained from real-time clock 108 (S503). The date data is stored as the Unloaded Date for the head that was removed, and as the Loaded Date for the newly installed head.

The area used as the discharge counter area is retained as the historical data storage area, a new discharge counter storage area is reserved for the new head, and the counter area is cleared (S505). This completes detecting head replacement and reserving a new counter area.

Whether the printer should proceed with the normal printing process is then determined (S506), and if YES, data receiving, printing, and other normal printer processes are performed (S510). As described above, the temporary counter counts the number of discharge operations when the head is driven.

When the normal process ends, the value stored in the temporary counter is checked. If the temporary counter exceeds 1000, the discharge counter is incremented (S508). The temporary counter is then decremented by 1000 (S509) and checked again. Steps S507 to S509 are repeated until the temporary counter is less than 1000, and the procedure then loops back to S501.

For simplicity, ink jet head ID numbers are compared in the present embodiment to detect whether the head has been replaced, it is also possible to detect if the head has been removed by periodically checking whether the ID number can be read.

Furthermore, a real-time clock is used as the time information obtaining means in this embodiment, but the date or time information can also be supplied by the host computer. In this case the CPU 110 and interface 102 function as the time information obtaining means.

Figure 9:
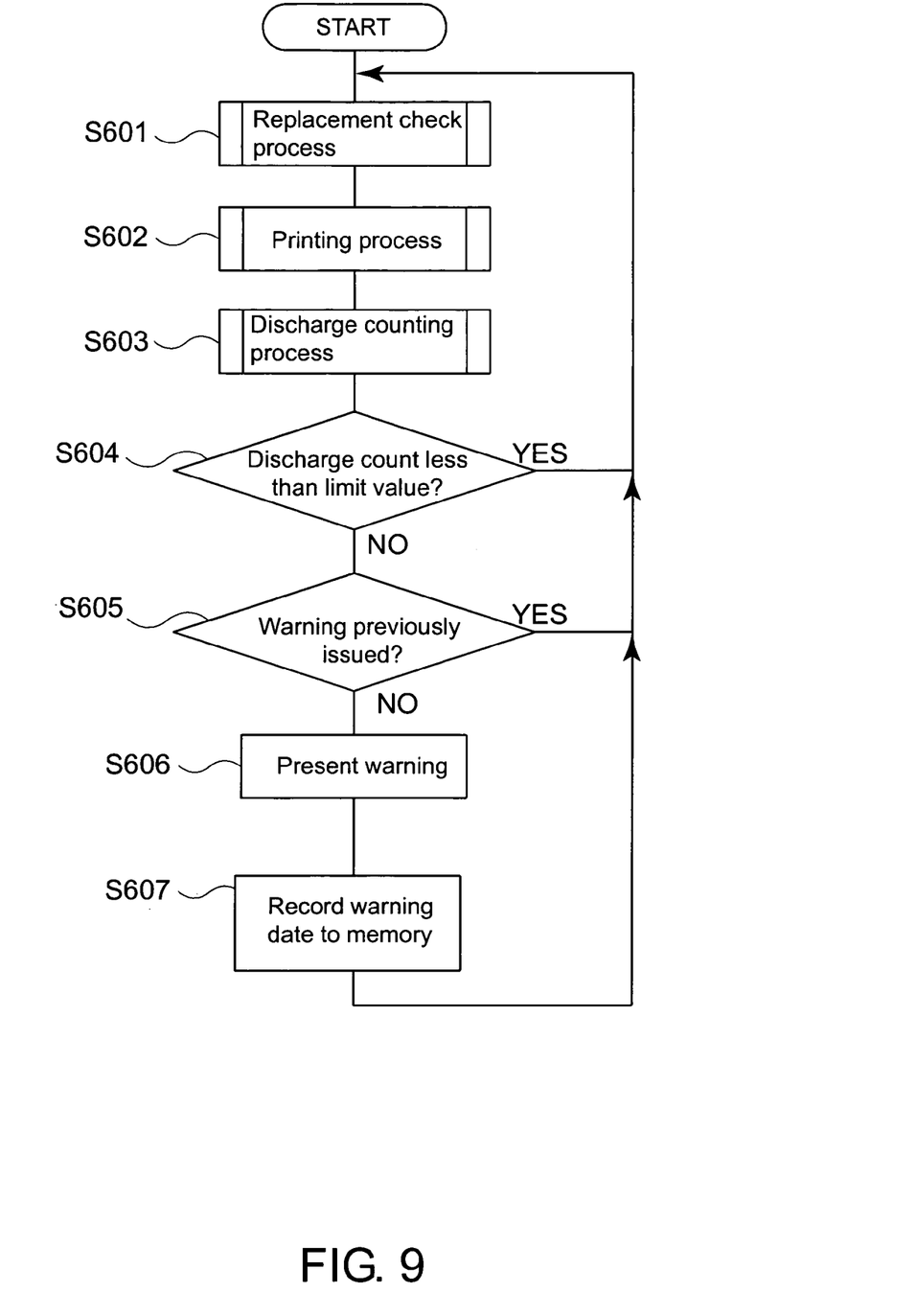
FIG. 9 is a flow chart of a printer control method according to a further alternative embodiment of the present invention.

FIG. 9 is a flow chart of a printer control method according to a further embodiment of the present invention. In this case, the printer is an ink jet printer as shown in FIG. 5.

After checking if the ink cartridge was replaced (S601), the printing process (S602), and the ink discharge counting step (S603), decision diamond S604 (i.e. CPU 110 under program control) detects whether the number of discharges is within the limit value stored in area 104a of ROM 104. If it is (S604 returns YES), the procedure loops back to S601 and the process repeats. If it is beyond the limit (S604 returns NO), step S605 detects whether or not a warning has already been issued. This can be determined by detecting whether a date has been stored in the warning date storage area. If a warning has not been issued, an appropriate warning is presented on LCD panel 109 (S606), and the date is stored in the Warning Date memory area of flash EEPROM 111.

This control sequence enables determination of whether or not the consumables in the printer currently selected by the user can be used. The host computer can thus check whether the warning process is being appropriately performed, and by comparison with the date on which the cartridge was replaced can inform the user by way of a printer driver function how many days have passed since the warning was issued.

It should also be noted that steps in the control method for controlling the above described printer can be recorded as a software program in a computer readable data storage medium from which the program is then read and run.

As will be evident from the above description of this preferred embodiment, the present invention provides a printer and a printer control method whereby quantitative information relating to the use and operation of replaceable or consumable printer parts or devices is stored for both current and previous parts and devices for use in maintenance control and further product development. Exemplary of this quantitative information is the amount of ink used for printing, the number of times a cutter is operated for cutting paper or other print medium, and the number of times the print head is driven for printing.

Furthermore, by additionally storing date information relating to when the replaceable part or device was replaced, more detailed information can be accumulated about the operating or consumable parts or devices, thus enabling more precise printer maintenance management. For example, by integrating this functionality in a POS printer used in stores, data relating to how many ink cartridges were consumed in one month can be read by way of the host computer and used for ink cartridge inventory control.

This information can also be effectively used for new product development, for example, by recovering the information from sites where the parts or devices are actually used.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A printer comprising:
   (a) a printing processor for printing at least one of text and graphics;
   (b) a holder for holding one of a plurality of replaceable units used in conjunction with the printing processor;
   (c) a detection processor for detecting at least one of mounting or replacement of the one replaceable unit in the holder;
   (d) a nonvolatile memory comprising a plurality of areas for storing data;
   (e) a counting processor for metering an amount related to a specific function of the one replaceable unit; and
   (f) a storage processor for storing a cumulative amount relating to the specific function of the one replaceable unit metered by the counting processor in a first specific area of the memory, and when the detection processor detects that the one replaceable unit is replaced with a new replaceable unit, storing a separate cumulative amount relating to the metered specific function of the new replaceable unit in a second specific area of the memory, and storing in a third specific area of the memory a total amount relating to the specific function.

2. A printer as in claim 1, wherein the one replaceable unit comprises a cutter device for cutting a print medium on which the printing processor prints text or graphics, and the counting processor meters the number of times the cutter device cuts the print medium.

3. A printer as in claim 1, wherein the one replaceable unit comprises an ink cartridge for supplying ink for the printing processor to print text or graphics, and the counting processor meters the amount of ink supplied in printing.

4. A printer as in claim 1, wherein the one replaceable unit comprises a print head for printing text or graphics, the printing processor prints text or graphics by driving the replaceable print head installed in the holder, and the counting processor calculates a print head drive count when printing text or graphics.

5. A printer as in claim 1, wherein the one replaceable unit comprises an operating unit related to the printing operation of the printer.

6. A printer as in claim 1, wherein the one replaceable unit comprises a consumable of the printer.

7. A printer as in claim 1, further comprising a reporting processor that reports to the printing processor information relating to amounts associated with at least one specific function stored in memory in response to a specific operation of the printer, and the printing processor printing the reported information.

8. A printer as in claim 7, further comprising a data communication processor connected to an external device for sending and receiving data therewith;

the reporting processor reporting to the printing processor information relating to amounts associated with at least one specific function stored in memory in response to a specific command from the external device, and the printing processor printing the reported information.

9. A printer as in claim 8, wherein the external device comprises a host computer, the reporting processor reports to the data communication processor information relating to amounts associated with at least one specific function stored in memory in response to a specific command from the host computer, and the data communication processor sends the information to the host computer.

10. A printer as in claim 1, further comprising a time information obtaining means for obtaining time information comprising at least date information identifying when the one replaceable unit is replaced, and the storage processor storing the date information in memory in correlation with the amount of the specific metered function at the time the one replaceable unit is replaced.

11. A printer as in claim 10, further comprising a real-time clock and the time information obtaining means is for reading the real-time clock.

12. A printer as in claim 10, further comprising an interface connecting to a host computer, and the time information obtaining means comprises a communication controller for obtaining time information from the host computer.

13. A printer comprising:
   (a) a printing processor for printing at least one of text and graphics;
   (b) a holder for holding one of a plurality of replaceable units used in conjunction with the printing processor;
   (c) a detection processor for detecting at least one of removal, installation, or replacement of the one replaceable unit in the holder;
   (d) a nonvolatile memory comprising a plurality of areas for storing data;
   (e) a counting processor for metering an amount relating to a specific function of the one replaceable unit;
   (f) a time information obtaining means for obtaining time information comprising at least date information;
   (g) a storage processor for storing a cumulative amount relating to the specific function metered by the counting processor in a specific area of the memory, and when the detection processor detects that the one replaceable unit is replaced with a new replaceable unit, storing in the memory amounts relating to the specific metered function of the one replaceable unit in conjunction with at least one of the date of the installation of the one replaceable unit or the date of replacement of the one replaceable unit obtained from the time information obtaining means;
   (h) usage limit memory for storing a usage limit value indicative of at least one of a maximum usable volume or count associated with the specific function of the one replaceable unit; and
   (i) a signal output section for outputting a signal indicative that at least one of the usage amount or count associated with the specific function of the one replaceable unit is at least one of near or at the stored usage limit value; and the storage processor stores another time information, including at least date information, obtained from the time information obtaining means in the nonvolatile memory in correlation with the one replaceable unit when the signal output section outputs said signal.

14. A printer as in claim 13, wherein the one replaceable unit comprises an ink cartridge, the amount associated with the specific function is an ink discharge count, and the counting processor comprises a discharge counter.

15. A control method for a printer having a printing processor for printing at least one of text and graphics, a holder for holding a replaceable unit used in conjunction with the printing processor, a nonvolatile memory comprising a plurality of areas for storing data, and a time information obtaining means for obtaining at least date information, comprising:
 (a) detecting at least one of removal, installation, or replacement of a replaceable unit in the holder;
 (b) calculating a cumulative amount relating to a specific function of a functional part of the removed, installed, or replaced replaceable unit starting from detection of at least one of removal, installation or replacement;
 (c) obtaining at least the date when at least one of removal, installation, or replacement of the removed, installed, or replaced replaceable unit is detected;
 (d) storing in a plurality of specific areas in the memory, separately for each of one of a plurality of removed, installed, or replaced replaceable units, a cumulative amount relating to a specific function of each one of the plurality of removed, installed, or replaced replaceable units in correlation with the date information;
 (e) comparing said cumulative amount with a usage limit value stored in a specific area of the memory, said usage limit value indicative of at least one of a maximum usable volume or count associated with the specific function of the removed, installed, or replaced replaceable unit;
 (f) outputting an alarm signal indicative that at least one of the usage amount or count associated with the specific function of the removed, installed, or replaced replaceable unit is at least one of near or at the stored usage limit value; and
 (g) storing another time information, including at least date information, in the nonvolatile memory in correlation with the removed, installed, or replaced replaceable unit when the alarm signal is output.

* * * * *